United States Patent [19]

Sugihara

[11] Patent Number: 4,589,039

[45] Date of Patent: May 13, 1986

[54] PINCH ROLLER ACTUATOR FOR TAPE RECORDER

[75] Inventor: Masanori Sugihara, Saitama, Japan

[73] Assignee: Pioneer Electronic Corporation, Tokyo, Japan

[21] Appl. No.: 413,845

[22] Filed: Sep. 1, 1982

[30] Foreign Application Priority Data

Sep. 2, 1981 [JP] Japan .................. 56-130480[U]

[51] Int. Cl.[4] ...................... G11B 5/008; G11B 15/00; G11B 17/00

[52] U.S. Cl. ...................... 360/90; 360/96.2; 360/96.4; 360/96.3

[58] Field of Search .............. 360/90, 93, 96.4, 105, 360/96.3, 96.2

[56] References Cited

U.S. PATENT DOCUMENTS

| | | |
|---|---|---|
| 3,469,800 | 9/1969 | Ayukawa ........................ 360/90 |
| 3,472,464 | 10/1969 | Morimoto et al. .............. 360/90 |
| 4,000,515 | 12/1976 | Fukawa ........................... 360/105 |
| 4,050,088 | 9/1977 | Okuda ............................. 360/90 |
| 4,219,852 | 8/1980 | Magata et al. ................. 360/90 |
| 4,358,800 | 11/1982 | Shimizu et al. ................ 360/90 |

FOREIGN PATENT DOCUMENTS

| | | | |
|---|---|---|---|
| 4721146 | 6/1968 | Japan ...................... | 360/93 |
| 52-40105 | 3/1977 | Japan ...................... | 360/105 |

Primary Examiner—A. J. Heinz
Assistant Examiner—Alfonso Garcia
Attorney, Agent, or Firm—Sughrue, Mion, Zinn, Macpeak and Seas

[57] ABSTRACT

A pinch roller actuator for use with a tape recorder includes a pinch roller holder and a play arm moved in association with tape recorder mode selection. The holder includes a cam surface slideably engaging a pin of the play arm, such that the holder is pivoted in response to movement of the pin.

4 Claims, 4 Drawing Figures

PINCH ROLLER ACTUATOR FOR TAPE RECORDER

BACKGROUND OF THE INVENTION

The present invention relates to a pinch roller actuator for a tape recorder, and more particularly to a pinch roller actuator for use in small-sized tape recordes such as cassette tape recorders equipped with radio receivers.

Tape feed mechanisms of tape recorders include a capstan and a pinch roller as principal parts. In the recording and playback modes of operation, the magnetic tape is pressed against the capstan by the pinch roller so as to be fed at a constant speed. In the rewinding and fast forward modes of operation, the tape is fed only by one of the reels with the pinch roller disengaged from the capstan to release the tape from contact with the capstan.

The pinch roller is movable into and out of contact with the capstan by an actuator operable in response to the changeover between tape feeding modes. The known actuator comprises as a drive source a plunger or a link mechanism movable in response to tape feed mode changeover. The actuator is actuated by a drive force which must be applied throughout a mode changeover operation when the pinch roller is brought into contact with the capstan. With the plunger-type actuator, a large-size plunger having a relatively large stroke is required. Where the link mechanism is employed, the manual mode changeover operation will be effected with an increased force unless the leverage is large, and if the leverage is large, then the link mechanism becomes large in size. Therefore, the known actuator mechanisms are relatively large in size and hence cannot be incorporated into small-size tape recorders.

SUMMARY OF THE INVENTION

It is an object of the present invention to provide a pinch roller actuator which is relatively small in size and simple in construction.

According to the present invention, a pinch roller holder having a pinch roller and a play arm for moving the pinch roller holder are held in contact with each other by the resiliency of a torsion spring, with a cam face of the pinch roller holder and a pin of the play arm being held in abutment. The cam face and the pin are relatively movable to slide on one another.

BRIEF DESCRIPTION OF THE DRAWINGS

The accompanying drawings illustrate a pinch roller actuator according to the present invention.

DETAILED DESCRIPTION OF THE EMBODIMENT

Figure 1:
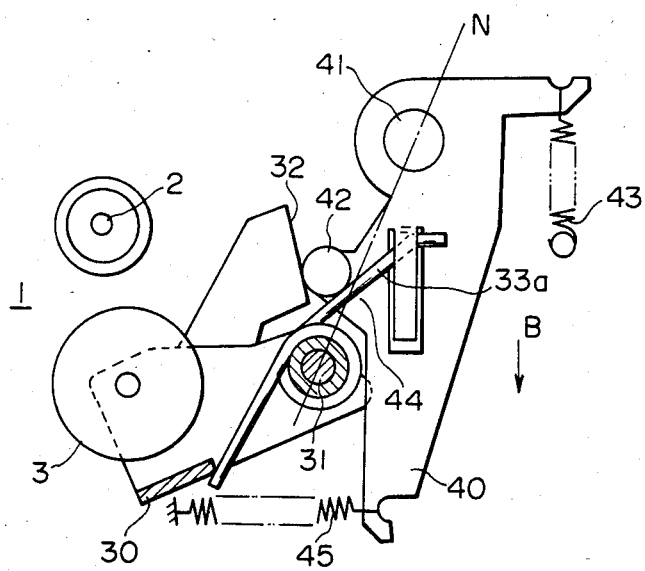
FIG. 1 is a plan view of the pinch roller actuator with the pinch roller disengaged from the capstan.

In FIG. 1, a chassis 1 supports a capstan 2 and a pinch roller holder 30 on which there is rotatably supported a pinch roller 3 which can be held against the capstan 2 under suitable pressure contact.

The pinch roller holder 30 is L-shaped as a whole and supports the pinch roller 3 on one end thereof, the pinch roller holder 30 having an intermediate portion pivotably supported on the chassis 1 by a pivot shaft 31. The other end of the pinch roller holder 30 has a flat end face serving as a cam face 32. The pinch roller holder 30 is normally urged by a torsion spring 33 coiled around the pivot shaft 31 to turn in a direction so as to press the pinch roller 3 against the capstan 2.

A play arm 40 is pivotably supported on the chassis 1 by a pivot shaft 41, and has a pin 42 mounted thereon and held in contact with the cam face 32 of the pinch roller holder 30. The play arm 40 is substantially in the shape of a T including a point of intersection at which the pivot shaft 41 is located. The T-shaped play arm 40 includes a horizontal bar having one end engaging an end of a tension spring 43 so that the play arm 40 is urged thereby to rotate in the direction of the arrow B.

The play arm 40 also includes vertical bar having an itermediate lateral projection 44 on which the pin 42 is mounted. The vertical bar has an end held in engagement with a tension spring 45 which urges the play arm 40 to rotate in the direction in which it is biased by the tension spring 43. The pin 42 is thus held in abutment against the cam face 32 of the pinch roller holder 30 to prevent the spring-urged rotation of the pinch roller holder 30. The torsion spring 33 coiled about the pivot pin 31 of the pinch roller holder 30 has an end 33a engaging the play arm 40 and another end contacting the holder 30 so as to counterbalance the forces of the tension springs 43, 45 which tend to rotate the pinch roller holder 30.

The pin 42 is movable toward either side of an imaginary neutral line N passing through the pivot shaft 31 of the pinch roller holder 30 and the pivot shaft 41 of the play arm 40.

Figure 2:
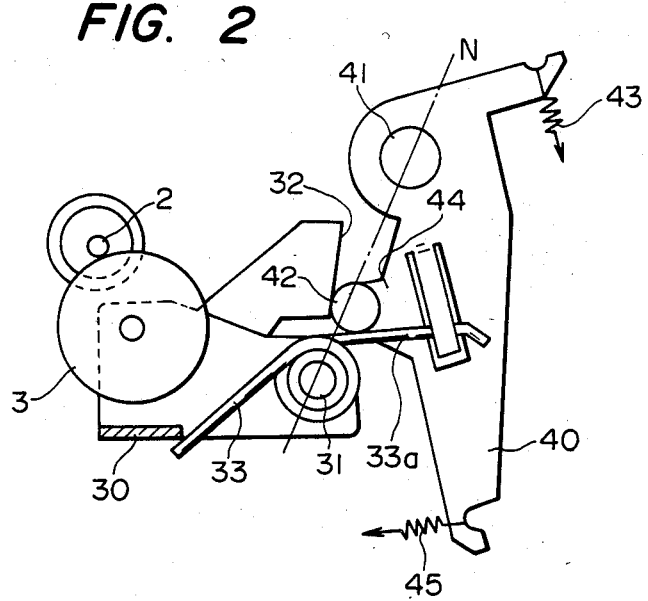
FIG. 2 is a plan view of the pinch roller actuator with the pinch roller held against the capstan.
Figure 3:
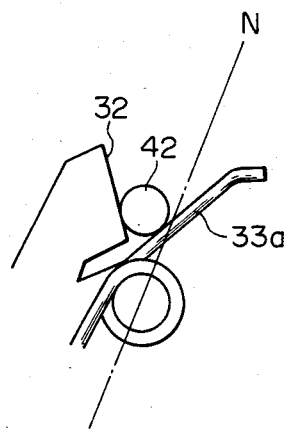
FIGS. 3 and 4 are fragmentary plan views showing a pin as positioned when the pinch roller is in and out of contact with the capstan, respectively.
Figure 4:
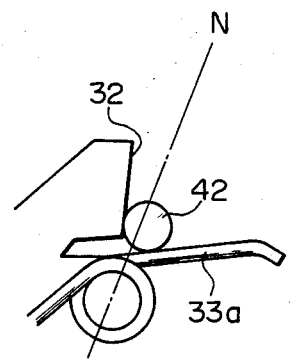

When the pin 42 is displaced leftwardly (as shown in FIG. 1) of the neutral line N, the play arm 40 is moved angularly clockwise, and when the pin 42 is displaced rightwardly (as shown in FIG. 2) of the neutral line N, the play arm 40 is moved angularly counterclockwise. Thus, the play arm 40 can be angularly moved wither leftwardly or rightwardly from the neutral point.

The play arm 40 can therefore be turned in either direction once it is imparted with a drive force to displace the pin 42 beyond the neutral line N. Stated otherwise, the pinch roller 3 can be brought into or out of contact with the capstan 2.

The operation of the pinch roller 3 in engaging or disengaging the capstan 2 will now be described. The pinch roller 3 is always either in or out of contact with the capstan 2. More specifically, during the recording and playback modes, the pinch roller 3 is held against the capstan 2 with the pin 42 of the play arm 40 being positioned beyond the neutral line N away from the capstan 2. By moving the pin 42 toward the cam face 32 beyond the neutral line N, the pinch roller 3 can be disengaged from the capstan 2. Such operation can be effected by moving the play arm 40 a distance large enough to displace the pin 42 across the neutral line N in coaction with a control button for a rewinding mode, for example.

For mode changeover from a stop, fast forward, or rewinding mode to a recording or playback mode, the play arm 40 is turned in the counter-clockwise direction in coaction with a mode changeover button and the pin 42 is moved beyond the neutral line N away from the cam face 32. Then the play arm 40 is thus angularly moved, the pin 42 pushes the end 33a of the torsion spring 33 while sliding down the cam face 32 to turn the pinch roller holder 30 clockwise.

With the pinch roller actuator for tape reecorders according to the present invention, as described above, the pinch roller holder having the pinch roller and the play arm operable in coaction with mode changeover are held in contact with each other through a cam face and a pin, and the pin is displaceable across a neutral line passing through the pivot shafts of the pinch roller holder and the play arm to thereby bring the pinch roller into and out of contact with the capstan. The pinch roller holder and the play arm are spring-biased to turn about their pivot shafts. The pinch roller can be moved as desired by simply displacing the pin to either side of the neutral line in response to angular movement of the play arm. The pinch roller actuator operates through a small stroke, is simple in construction, and can be driven with a small force.

What is claimed is:

1. A pinch roller actuator for use in a tape recorder, comprising, a chassis, a capstan rotatably mounted on said chassis, a pinch roller holder pivotably mounted on said chassis, a play arm pivotably mounted on said chassis and movable in coaction with a mode changeover means of the tape recorder, said pinch roller holder having a pinch roller at one end thereof and a cam face at the other end thereof, said play arm having an integral pin confronting said cam face, and torsion spring means for urging said cam face in a first rotational direction into sliding contact with said pin, and engaging an integral part of said play arm for causing said pinch roller holder to rotate in said first rotational directional concurrently with the rotation of said play arm in a second rotational direction whereby pivoting of said play arm causes displacement of said pin to pivot said pinch roller holder such that said pinch roller engages and disengages said capstan.

2. An actuator as claimed in claim 1, said pinch roller holder and said play arm being mounted on pivot shafts, said play arm pin moving from one side of a line joining said pivot shafts to the other side thereof while in contact with said cam face.

3. An actuator as claimed in claim 2, wherein said torsion spring means comprises a torsion spring mounted on said holder pivot shaft and having a first end engaging a part of said holder and a second end engaging said intergral part of said play arm.

4. An actuator as claimed in claim 3, further including tension spring means for urging said play arm about its pivot shaft.

* * * * *